April 2, 1957  L. A. CARRIOL  2,787,294
COMBINED VALVE AND SHUT-OFF MEANS THEREFOR
Filed Nov. 12, 1952  5 Sheets-Sheet 1

Fig.1

INVENTOR:
LOUIS AUGUSTE CARRIOL
BY:

INVENTOR:
LOUIS AUGUSTE CARRIOL
BY:

April 2, 1957  L. A. CARRIOL  2,787,294
COMBINED VALVE AND SHUT-OFF MEANS THEREFOR
Filed Nov. 12, 1952  5 Sheets-Sheet 3

INVENTOR:
LOUIS AUGUSTE CARRIOL
BY:

Fig.12

United States Patent Office 2,787,294
Patented Apr. 2, 1957

2,787,294

COMBINED VALVE AND SHUT-OFF MEANS THEREFOR

Louis Auguste Carriol, Aulnay-sous-Bois, France, assignor to "S. A. T. A. M. Societe Anonyme pour Tous Appareillages Mecaniques," La Courneuve, France, a French company Application November 12, 1952, Serial No. 319,985

Claims priority, application France April 19, 1952

30 Claims. (Cl. 141—209)

This invention relates to a receptacle filling device or valve having an automatic stop acting to cause cessation of the delivery of liquid into the receptacle when liquid therein reaches a chosen level, and has for its object to provide improved automatic stop or shut-off means for such a device.

The present invention mainly consists in a combined valve and shut-off means therefor which include a valve casing having a fluid inlet and a fluid outlet, and a valve seat therebetween. A valve member is arranged in the valve casing and is movable between valve-opening and valve-closing positions. Fluid pressure operable means are provided for holding the valve member in valve-opening position, and the valve member is adapted automatically to return into valve-closing position when exertion of fluid pressure on the fluid pressure operable means is terminated.

Enclosure means are provided which define a projecting chamber, and a pressure fluid conduit is arranged in the projecting chamber. The pressure fluid conduit has an open end and has its other end in communication with the fluid pressure operable means. A nozzle member is also arranged in the projecting chamber and is in communication with the valve casing at a portion thereof which is intermediate the fluid inlet thereof and the valve seat thereof. The nozzle member faces the open end of the pressure fluid conduit so as to be adapted to project a jet of fluid against the open end of the pressure fluid conduit when fluid flows through the intermediate portion of the valve casing and consequently through the nozzle member. The pressure fluid conduit is thereby filled with fluid under pressure and operates the fluid pressure operable means in such a manner as to hold the valve member in valve-opening position.

Conduit means are provided which terminate at one end in the projecting chamber in the region intermediate the nozzle member and the open end of the pressure fluid conduit for admitting gaseous medium sucked into the region by the jet of fluid emitted by the nozzle member. Termination of admittance of gaseous medium into the conduit means will therefore automatically terminate the formation of the jet of fluid. This, in turn, results in reduction of the fluid pressure in the pressure fluid conduit and in movement of the valve member to valve closing position.

The invention is hereinafter described with reference to the accompanying drawings, which show examples of the invention, and in which.

Figure 1:
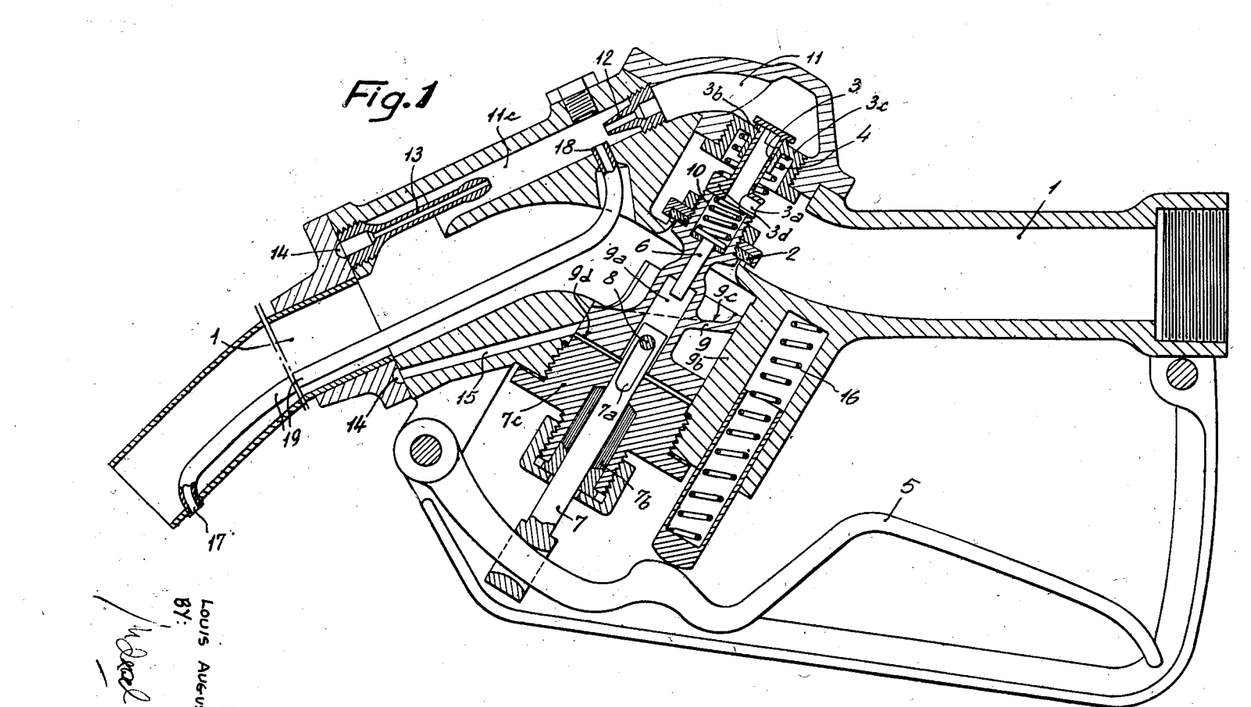
Figure 1 is a longitudinal section through a receptacle filling device according to the invention, the device being in the form of a hosecock such as is used with meter pumps for delivering liquid fuels.
Figure 2:
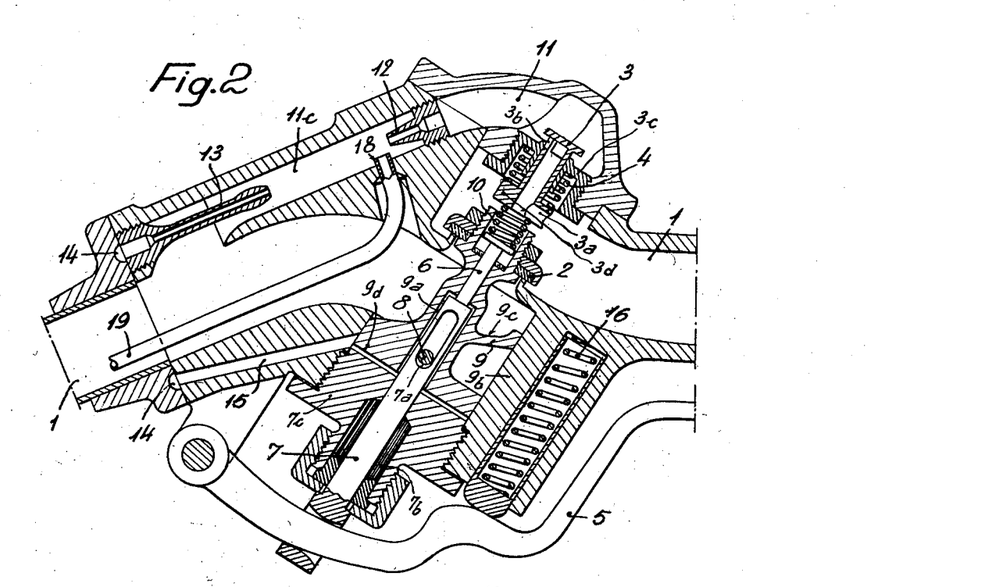
Figure 2 is a section through the centre part of the hosecock shown in Figure 1, with the auxiliary valve open and the main valve closed.
Figure 3:
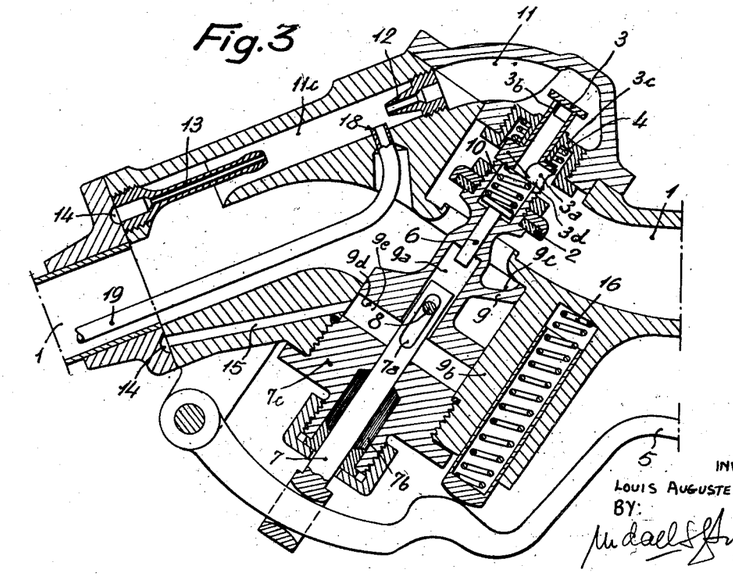
Figure 3 is a section similar to Figure 2 but with the main valve open.

The hosecock or combined valve and shut-off means therefor illustrated in Figures 1 to 3 comprises a main distribution duct or valve casing 1, a non-return valve 2, called the main valve member, an auxiliary valve 3 consisting of a tube formed with lateral apertures 3a and 3b and adapted to slide in a cap 3c, a spring 4 bearing against the end of the cap 3c and forcing a widened portion 3d of the tube 3 into the position for closing the apertures 3b with a force of about 900 grammes, a manually operable operating grip 5 controlled by the operator, a push rod 6 sliding in a bore in the main valve 2, a rod 7 controlled by the grip 5 and moving in a bore 9a in a piston 9 fast with the main valve 2 and a pin 8 fast with the piston 9 and extending through an aperture 7a in the rod 7, so that the rod 7 can force the push rod 6 back without moving the piston 9. A stuffing box 7b prevents leakage between the rod 7 and a nut 7c screwed on the body of the hosecock and closes the cylinder 9b in which the piston 9 slides. The effective cross-section of this piston 9 is greater than that of the main valve 2.

One of the faces 9c of the piston 9 is continuously subjected to the action of the pressure acting in that part of the main duct 1 which is situated downstream of the main valve 2.

In addition, 10 is a spring disposed between the push rod 6 and the auxiliary valve 3 and having substantially no force in the extended position illustrated in Figure 1 and a force of about 800 grammes in the compressed position illustrated in Figure 3. 11 is a branch connecting those parts of the duct 1 which are situated upstream and downstream of the main valve 2, 12 is a jet nozzle member disposed in an enclosure means 11c which defines a projecting chamber in the branch 11, 13 is a pressure intake or pressure fluid conduit receiving the jet of liquid projected by the nozzle 12, 14 is an annular groove establishing communication between the interior of the intake 13 and a duct or fluid conduit 15 opening in the cylinder 9b into the chamber 9e formed in this cylinder by the face 9d of the piston 9 and the screwthreaded plug 7c, 16 is a very powerful spring constantly tending to bring the lever 5 into the position illustrated in Figure 1, 17 is an orifice situated in the neighbourhood of the downstream end of the duct 1, 18 is an orifice leading into the enclosed space 11c downstream of the jet nozzle 12 and upstream of the pressure intake 13, and 19 is a duct connecting the orifices 17 and 18.

This hosecock operates as follows:

In order to fill a tank, the nozzle of the hosecock is introduced into the latter until the orifice 17 is at the level at which the filling is to stop. After having started the feed pump, the operator presses the lever 5 upwardly, as viewed in Figs. 1–3, thus compressing the spring 16, whereby the rod 7 is moved. This displacement has no effect on the assembly comprising the piston 9 and the valve 2, but forces back the push rod 6 and compresses the spring 10.

The valve 3 is subjected on one side to the action of the spring 4 and on the other side to the action of the compressed spring 10 and of the liquid acting on the end of the tube, whereby it is opened. The liquid, which is at a pressure of, for example, 1400 g. per cm.² in the upstream part of the duct 1, flows through the apertures 3a, the interior of the tube 3 and the apertures 3b in the branch 11, into the jet nozzle 12. The jet of liquid leaving the nozzle 12 has substantially the form of a cylinder, the cross-section of which is substantially equal to that of the orifice of the jet nozzle 12. The outer part of the jet encounters the pressure intake 13 and widens out substantially to the form of a hemisphere tangential to the walls of the projecting chamber 11c, while drawing in air from the receptacle, the air arriving through 17, 19 and 18. The central part of the jet is taken up by the pressure intake 13, thus creating in the latter a pressure which is transmitted through the groove 14 and the duct 15 into the chamber 9e and in particular on to the face 9d of the piston 9.

The assembly comprising the valve 2 and the piston 9 is then subjected: (a) to the upstream pressure of the liquid on the valve 2, which tends to close it, (b) to the pressure obtaining on the downstream face of the valve 2 and on the face 9c of the piston 9, which tends to close the valve 2, since the effective surface of the piston 9 is larger than that of the valve 2, and (c) to the pressure in the intake 13 acting on the face 9d, which tends to open the valve 2.

Under the action of these combined pressures, the valve 2 opens, and the liquid passes therethrough and fills the tank. The valve 2, in its open position, maintains the valve 3 open. The parts are then in the position shown in Figure 3. When the liquid reaches the orifices 17 in in the tank, no further air arrives through the duct 19 and the orifice 18. The jet from the ejector 12 widens out as soon as it leaves the latter and loses velocity. The pressure decreases and may be nullified in the pressure intake 13. Consequently, the pressure on the face 9d decreases. The combined pressures acting on the valve 2 and the piston are such that the valve 2 closes, and since the valve 3 is no longer maintained thereby it also closes. The delivery stops even if the lever 5 is still maintained by the operator, since the pin 8 is arranged to move in the aperture 7a. It is to be noted that if the operator wishes to stop the delivery before the liquid reaches the level of the orifice 17, he releases the lever 5. The spring 16 then rocks the said lever, and the rod is retracted and forces the valve 2 to close under the action of the pin 8 on the end of the aperture 7a.

Figure 4:
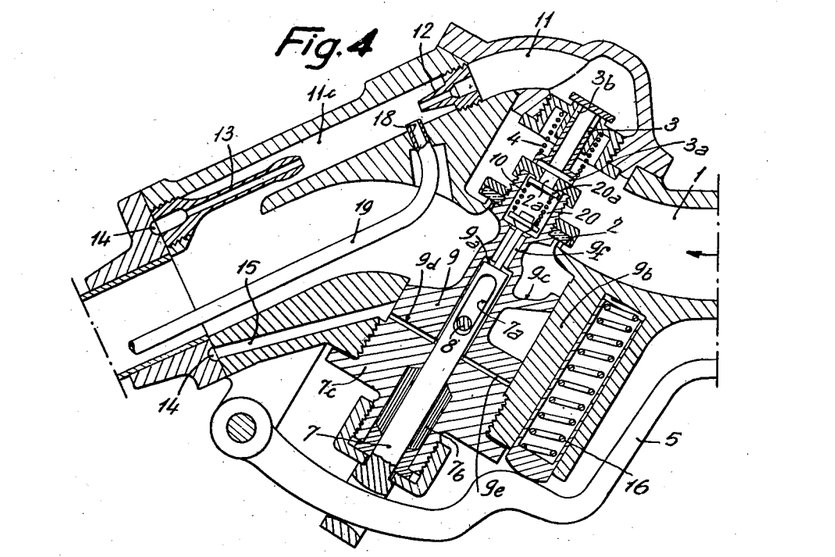
Figure 4 is a longitudinal section through the centre part of a hosecock constituting another form of filling device according to the invention.

The device illustrated in Figure 4 differs from that illustrated in Figures 1 to 3 in that the push rod 6 is replaced by a valve 20, called the second auxiliary valve. The spring 10 is disposed between the latter valve and a third auxiliary valve 20a guided in the bore of the valve tube 3. This second auxiliary valve 20 closes a bore or fluid conduit 9f in the piston 9, so that its opening places that part of the duct which is situated upstream of the main valve 2 in communication with the face 9d through the aperture 2a, the bore 9f and the space situated between the rod 7 and the bore 9a in which the latter moves.

This device operates in the following manner:

In order to fill a tank, the nozzle of the hosecock is introduced into the tank until the orifice 17 is situated at the level at which the filling is to be stopped. After having started the feed pump, the operator presses the lever 5, thus compressing the spring 16, whereby the rod 7 is moved. This movement has no effect on the combined piston 9 and valve 2, but opens the second auxiliary valve 20 and compresses the spring 10. The valve 20a opens against the action of the spring 10 under the pressure of that part of the duct 1 which is situated upstream of the valve 2.

Under these conditions, the latter pressure is transmitted to the face 9d of the piston 9. The assembly comprising the valve 2 and the piston 9 is then subjected to the pressure of the liquid upstream of the valve 2, which tends to close it, to the pressure acting downstream of the valve 2 on the downstream face of the latter and on the face 9c of the piston 9, which tends to close the valve 2 since the effective surface of the piston 9 is larger than that of the valve 2, and to the pressure acting on the face 9d, which tends to open the valve 2. Under the action of these combined pressures, the valve 2 opens, and the liquid passes therethrough and fills the tank. As soon as the operator sees that the liquid flows, he releases partially the lever 5.

The valve 3 is then lifted by the valve 2. The liquid, which is under a pressure of, for example, 1400 g. per cm.² in the upstream part of the duct 1, flows through the apertures 3a, the interior of the tube 3 and the apertures 3b in the branch 11 and passes into the jet nozzle 12. The jet of liquid leaving the nozzle 12 has substantially the form of a cylinder, the cross-section of which is substantially equal to that of the orifice of the nozzle 12. The outer part of the jet encounters the pressure intake 13, widens out substantially to the form of a hemisphere tangential to the walls of the chamber 11c, thus drawing in air from the receptacle, the said air arriving through 17, 19 and 18. The central part of the jet is taken up by the pressure intake 13 thus creating in the latter a pressure which is transmitted through the groove 14 and the duct 15 into the chamber 9e and in particular on to the face 9d of the piston 9. The pressure in the pressure intake 13 and on the face 9d is then sufficient to maintain the valve 2 open even when the second auxiliary valve 20 has re-closed the bore 9f as a result of the opening of this valve 2. Thus, the valve 2 is opened by the upstream pressure and is maintained open by the pressure in the pressure intake 13.

When the liquid reaches the orifice 17 in the tank, no further air arrives through the duct 19 and the orifice 18. The jet from the ejector 12 widens out immediately it leaves the latter and loses velocity. The pressure in the pressure intake therefore decreases and may even be nullified. Consequently, the pressure on the face 9d decreases. The combined pressures acting on the valve 2 and the piston 9 are then such that the valve 2 closes and consequently the valve 3, which is no longer maintained by the valve 2, also closes. The delivery ceases even if the lever 5 is still maintained by the operator, since the pin 8 is capable of moving in the aperture 7a.

It is to be noted that if the operator wishes to stop the delivery before the liquid reaches the level of the orifice 17, he releases the lever 5. The spring 16 then rocks the said lever, and the rod 7 is retracted and forces the valve 2 to close under the action of the pin 8.

Figure 5:
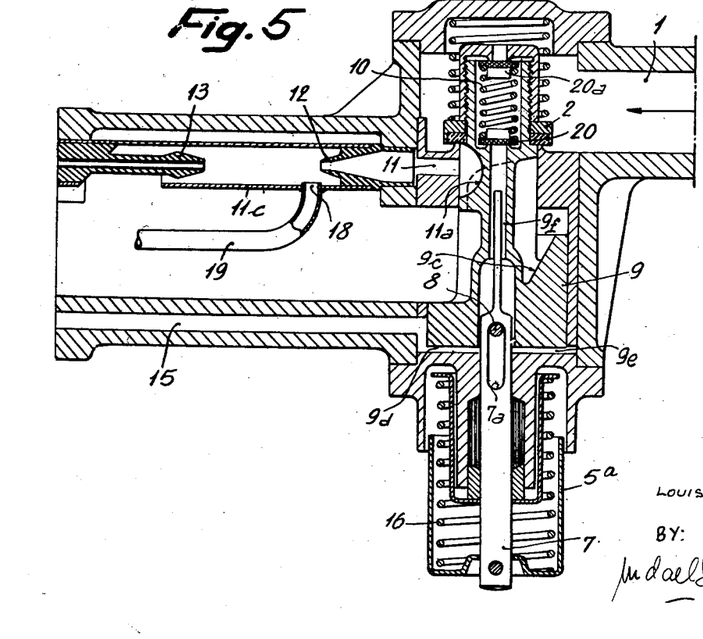
Figure 5 is a longitudinal section through the centre part of another form of filling device according to the invention.

The filling device illustrated in Figure 5 differs from that illustrated in Figure 4 in that the valve 3 is omitted and the branch 11 is controlled by the main valve 2. It is to be noted also that a groove 11a of rounded form reduces the pressure losses of the liquid before it enters the actual branch 11. Finally, a third difference resides in that the lever 5 is replaced by a push button 5a loaded by a spring 16.

This valve device operates as follows:

In order to fill the tank, the end of the valve device is introduced into the tank until the orifice 17 reaches the level at which the filling is to be stopped. After having started the feed pump, the operator pushes the push button 5a upwardly as viewed in Fig. 5, thus compressing the spring 16, whereby the rod 7 is moved. This movement has no effect on the assembly comprising the piston 9 and the valve 2, but opens the second auxiliary valve 20 and compresses the spring 10. The valve 20a opens despite the action of the spring 10, under the pressure of that part of the duct 1 which is situated upstream of the valve 2. Under these conditions, the latter pressure is transmitted to the face 9d of the piston. The assembly comprising the valve 2 and the piston 9 is then subjected on the one hand to the action of the pressure of the liquid upstream of the valve 2, which tends to close the said valve to the pressure acting downstream of the valve 2 on the downstream face of the latter and on the face 9c of the piston 9, which tends to close the valve 2 since the effective surface of the piston 9 is larger than that of the valve 2 and to the pressure acting on the face 9d, which tends to open the valve 2. Under the action of these combined pressures, the valve 2 opens and the liquid passes therethrough and fills the tank.

The valve 2, in rising, opens the branch 11. The liquid situated upstream of the valve 2, under a pressure of, for example, 1400 g. per cm.², flows through the groove 11a in the branch 11 and passes into the jet nozzle 12. The jet of liquid leaving the nozzle 12 has substantially the form of a cylinder, the cross-section of which is substantially equal to that of the orifice of the nozzle 12. The outer part of the jet encounters the pressure intake 13, widens out substantially to the form of a hemisphere tangential to the walls of the duct 11, thus drawing in air from the receptacle, the said air arriving through 17, 19 and 18. The central part of the jet is taken up by the intake 13, thus creating in the latter a pressure which is transmitted through the groove 14 and the duct 15 into the chamber 9e and acts on to the face 9d of the piston 9. The pressure of the intake 13 on the face 9d is then sufficient to maintain the valve 2 open, even when the second auxiliary valve 20 has re-closed the bore 9f as a result of the opening of the said valve 2. Thus, the valve 2 is opened by the upstream pressure and is maintained open by the pressure in the intake 13. When the liquid in the tank reaches the orifice 17, no further air arrives through the duct 19 and the orifice 18. The jet from the nozzle 12 widens out immediately on leaving the latter and loses velocity. The pressure decreases and may even be nullified in the intake 13. Consequently, the pressure on the face 9d decreases. The combined pressures acting on the valve 2 and the piston 9 are such that the valve 2 closes. The closing of the valve 2 then results in closing of the branch 11. The delivery ceases even if the push button 5a is maintained in the depressed position by the operator, since the pin 8 is capable of moving in the aperture 7a. It is to be noted that if the operator wishes to stop the delivery before the liquid reaches the level of the orifice 17, he releases completely the push button 5a. The spring 16 forces the latter back, the rod 7 is retracted and forces the valve 2 to close under the action of the pin 8.

It is to be noted that the valve 20a, which prevents all operation of the valve device as long as the upstream pressure is insufficient to compress the spring 10, is situated in the duct 9f, which only delivers at the time of opening. Under these conditions, the valve 20a with its spring 10 creates no actual pressure loss during the normal delivery.

There could also be disposed on the end of the push rod 7 a spring which, in the course of the movement of the push rod 7, transmits the effort from the latter to the second auxiliary valve 20 and causes the latter to open suddenly, its force being greater than that of the spring 10.

Figures 6, 7, 8, 9, 10, 11:
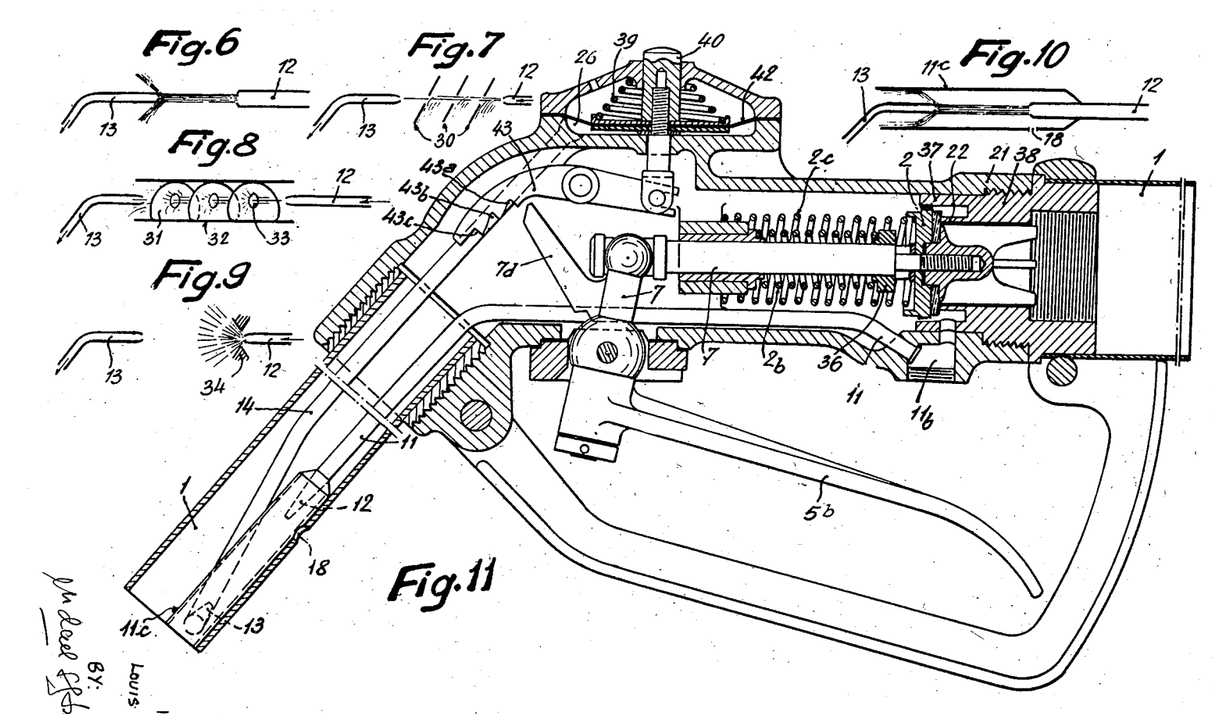
Figures 6 to 10 are diagrammatic views showing various arrangements of the jet nozzle member and pressure intake assembly of the invention.
Figure 11 is a longitudinal section through a hosecock constituting another form of filling device according to the invention.

It is sometimes advantageous to reduce the distance between the pressure intake 13 and the jet nozzle 12, but this reduction is frequently limited by the necessity to permit the disturbing action to take place under the effect of the admission of air through the duct 17, 19, 18. In order that this distance may be reduced, inclined baffles 30 may be disposed between 12 and 13, the said baffles being formed with an elliptical hole such that the normal jet passes without obstruction, as is shown in Figure 7. As soon as the disturbing action takes place, the jet widens out slightly on leaving the jet nozzle 12 and is rapidly deflected from its normal direction by the successive baffles 30, whereby the pressure drop in the intake 13 is accelerated.

Instead of the baffles 30, a single baffle 31 of helical form may be provided in a cylindrical duct 32, as shown in Figure 8. This surface is formed with a central free passage 33 for the normal passage of the jet.

Under the aforesaid disturbing action, the jet is deflected and the liquid undergoes a helical movement. The pressure in the intake 13 also falls rapidly.

Instead of the baffles 30 or 31, a conical head 34 may be disposed about the jet nozzle 12 as indicated in Figure 9. Under the aforesaid disturbing action the jet of liquid widens out and the pressure in the intake 13 falls.

More simply again, the jet nozzle 12 and the intake 13 may be disposed in a lateral tube 11c communicating through 18 with a point of the limit level, as indicated in Figure 10.

The delivery nozzle shown in Figure 11 comprises the jet nozzle device illustrated in Figure 10 and a valve 2. The said valve is maintained in its closed position by two springs 2c and 2b bearing against the nozzle body 21. The spring 2c acts directly on the valve 2 and is sufficient to maintain the latter in the closed position when the upstream pressure is reduced to the static pressure of the liquid, that is to say, when the pump is stopped.

The spring 2b bears against a shoulder 36 on a push rod 7, against the end of which the valve 2 abuts. The force of this spring 2b is sufficient to oppose the opening of the valve 2 regardless of the pressure of the liquid upstream, even when the pump is in operation. The action of this spring 2b on the valve 2 can be neutralised by the operator by pressing the lever 5b, the valve 2 then remaining on its seat under the action of the spring 2c, which is compressed when the pump is set in operation.

A duct 11b leads to a point downstream of the seat 22 of the valve 2, but in the neighbourhood of the latter and in that zone of the duct 1 in which the liquid is deflected by the head of the valve 2 and has not completely passed through the latter. The head of the valve 2 extends beyond the seat to a point opposite the inlet of the duct 11b so as to force the liquid to some extent into this duct 11b. The liquid penetrating into this duct 11b passes through the tube 11 and, on leaving the nozzle 12, forms a jet which encounters the intake 13 as long as the device 12, 13, is in a gaseous atmosphere. Since the cross-sectional area of the opening of the intake 13 is entirely submerged by the jet, there is set up in this intake a stable pressure which is slightly lower than that of the nozzle 12. The pressure in the intake 13 is communicated through the tube 14 to the chamber 26 situated below the diaphragm 42 and will raise the latter. This movement is transmitted to a lever 43, the arm of which, in which the notches 43a, 43b and 43c are formed, is lowered. The lever 7 comprises an arm 7d, the end of which is arranged to enter one of the said notches.

An outer push button 40 is provided to enable the diaphragm 42 to be pushed down at any instant for the purpose of stopping the delivery.

The operation is as follows:

When it is desired to fill a receptacle, the end of the delivery nozzle is introduced into the said receptacle. The operator exerts a light pressure on the lever 5b. Since the rod is moved to the rear against the action of the spring 2b by this movement, the valve 2 opens as soon as the pump is started and places the liquid under a pressure sufficient to overcome the action of the spring 2c. Some of the liquid passes through the duct 11b and the tube 11 and leaves the nozzle 12 in the form of a jet. This jet encounters the intake 13, in which a stable pressure is set up. This pressure is communicated through the duct 14 to the chamber 26 and raises the diaphragm 42. The lever 43 is thereby rocked in the counterclockwise direction until the end of the arm 7d falls into the notch 43a, as a result of which the rod 7 is locked in an inoperative position on the valve 2. The latter is maintained in the open position despite the action of the spring 2c by the pressure of the fluid. If further pressure is exerted on the lever 5b, a larger delivery is obtained and the lever 7d enters the notch 43b or the notch 43c according to this increase.

When the level of the liquid in the receptacle being filled reaches the orifice 18, it enters the tube 11c and retards the jet leaving the nozzle 12. At a given instant, the jet fails to reach the intake 13. The pressure in the latter decreases and is transmitted to the chamber 26 and the diaphragm 42 descends under the action of the spring 39. The lever 43 then rocks in the clockwise direction, and the lever 7d is disengaged from the notch in which it is situated. Assuming that the operator releases the lever 5b at this instant, the spring 2b forces back the rod 7, the end of which pushes the valve 2 on to its seat 22, whereby the delivery is stopped.

If, for any reason, it is necessary to stop the delivery before the level of the liquid reaches the orifice 18, the button 40 may be depressed, whereby the lever 7d is disengaged from one of the notches in the lever 43 and the valve 2 is closed.

In Figure 11, the valve 2 moves, at the beginning of its rising movement, in a cylindrical recess 37 in the member 38 on which the seat 22 is mounted, the outer diameter of the valve 2 being slightly smaller than the inner diameter of the extension 37. The provision of this extension 37 has the object, while taking into account the force of the spring 2c, of maintaining a sufficient and substantially constant pressure in the duct 11b and in the jet nozzle 12 when the delivery of the device is low. The inner surface of the extension 37 could also be given a splayed form so that, in proportion as the rising movement of the valve 2 increases, and consequently also the delivery, the space between the extension 37 and the valve 2 increases, while a sufficient substantially constant pressure is maintained in the duct 11 and consequently in the jet nozzle 12 independently of the force of the spring 2c.

In all the devices hereinbefore described, the supply of liquid is suddenly stopped, which may be disadvantageous, particularly where large quantities are necessary in the filling, for example in the case of large tanks.

Figure 12:
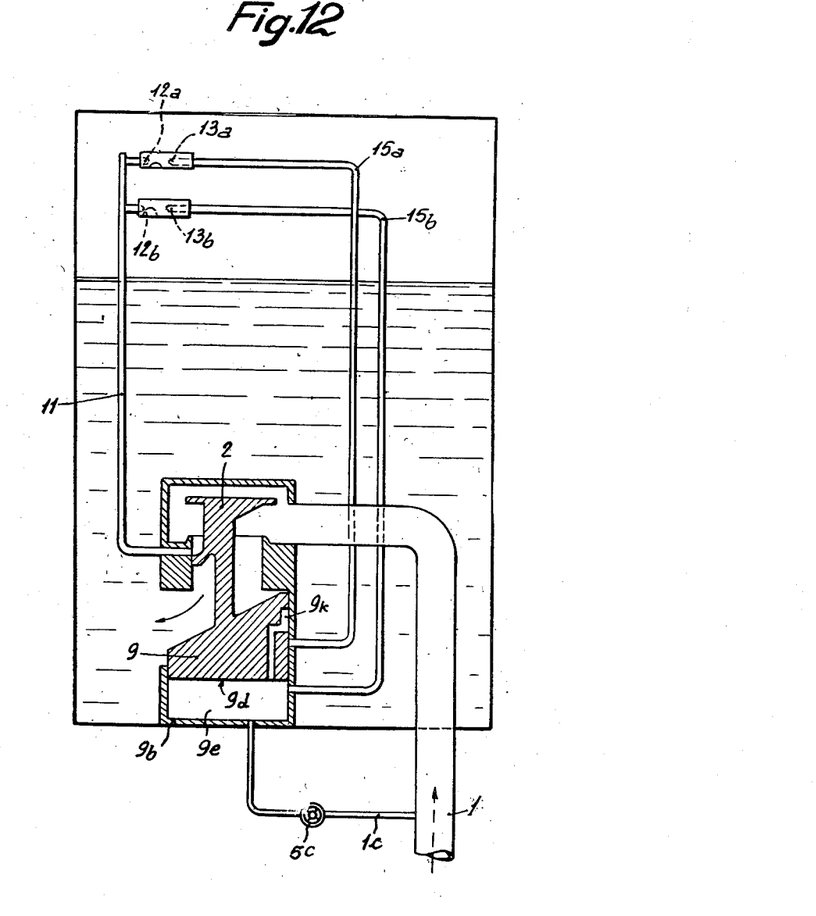
Figure 12 is a diagrammatic view of a receptacle having mounted in it another form of filling device according to the invention.

This disadvantage is obviated by the arrangement shown in Figure 12. The main valve 2 is associated with a piston 9 of the type described with reference to Figure 5.

The branch 11 leads to two ejectors 12a and 12b and to two pressure intakes 13a and 13b disposed at different levels in the receptacle to be filled. The intakes 13a and 13b are connected to the cylinder 9b at different levels by ducts 15a and 15b.

Finally, a cock 5c controls a branch 1c of the liquid supply duct 1 performing a similar function to the duct 9f of Figure 5.

This arrangement operates as follows:

In order to fill the receptacle, the cock 5c is opened, and the liquid under pressure lifts the piston 9 and the valve 2 by acting on the face 9d. The opening of the valve 2 permits the liquid to enter the receptacle and the pipe 11. The jet nozzles 12a and 12b emit jets having substantially the form of a cylinder, the cross-section of which is substantially equal to that of the orifices of the jet nozzles 12a and 12b and which encounter the pressure intakes 13a and 13b as in the preceding examples.

The pressure produced in the intake 13b is transmitted through the duct 15b to the chamber 9e, while the pressure produced in the intake 13a is still ineffective, the pipe 15a being closed by the piston 9, as will be seen from Figure 12. The pressure exerted by the intake 13b on the piston 9 is sufficient in itself to maintain the piston 9 in the raised position. The cock 5c is then closed. When the level of the liquid reaches the nozzle 12b, the pressure decreases and is even nullified in the intake 13b. The valve 2 then tends to close under the action of the current of liquid until the port 9k arrives opposite the pipe 15a and the pressure in the intake 13a maintaining the valve 2 in a partly open or intermediate position and prevents further closing thereof. The delivery is then slowed down until the nozzle 12a is submerged by the liquid and the pressure in the intake 13a thus falls and permits the valve 2 to close completely.

As described above, each set which includes a jet nozzle 12 and a pressure intake 13 may be disposed in an enclosure or shroud 11c which defines a projecting chamber. Although such enclosure is desirable, is not absolutely necessary, particularly in the case in which it is possible for the jet nozzle 12 and pressure intake 13 to be drowned by the liquid in the receptacle to be filled, as shown in Figure 12.

What I claim is:

1. A combined valve and shut-off means therefor, comprising in combination, a valve casing having a fluid inlet and a fluid outlet and a valve seat therebetween; a valve member in said valve casing movable between valve-opening and valve-closing positions; fluid pressure operable means for holding said valve member in valve-opening position, said valve member automatically returning into valve-closing position when exertion of fluid pressure on said fluid pressure operable means is terminated; a pressure fluid conduit having an open end located in said fluid outlet facing the fluid passing through said fluid outlet and connected at its other end to said fluid pressure operable means; a nozzle member arranged in said fluid outlet between said valve seat and said open end of said pressure fluid conduit facing the same so as to be adapted to project a jet of fluid against said open end of said pressure fluid conduit when said valve member is in valve-opening position, thereby filling said pressure fluid conduit with fluid under pressure and operating said fluid pressure operable means, holding said valve member in valve-opening position; and conduit means terminating at one end in said fluid outlet between said nozzle member and said open end of said pressure fluid conduit for admitting gaseous medium sucked into said fluid outlet by the jet of fluid emitted by said nozzle member, so that termination of admittance of gaseous medium into said conduit means will automatically terminate formation of the jet of fluid, resulting in reduction of the fluid pressure in said pressure fluid conduit and consequent movement of said valve member into valve-closing position.

2. A combined valve and shut-off means therefor, comprising in combination, a valve casing having a fluid inlet and a fluid outlet and a valve seat therebetween; a valve member in said valve casing movable between valve-opening and valve-closing positions; fluid pressure operable means for holding said valve member in valve-opening position, said valve member automatically returning into valve-closing position when exertion of fluid pressure on said fluid pressure operable means is terminated; auxiliary valve means operable for admitting fluid under pressure to said fluid pressure operable means for initially moving said valve member into valve-opening position; a pressure fluid conduit having an open end located in said fluid outlet facing the fluid passing through said fluid outlet and connected at its other end to said fluid pressure operable means; a nozzle member arranged in said fluid outlet between said valve seat and said open end of said pressure fluid conduit facing the same so as to be adapted to project a jet of fluid against said open end of said pressure fluid conduit when said valve member is in valve-opening position, thereby filling said pressure fluid conduit with fluid under pressure and operating said fluid pressure operable means, holding said valve member in valve-opening position; and conduit means terminating at one end in said fluid outlet between said nozzle member and said open end of said pressure fluid conduit for admitting gaseous medium sucked into said fluid outlet by the jet of fluid emitted by said nozzle member, so that termination of admittance of gaseous medium into said conduit means will automatically terminate formation of the jet of fluid, resulting in reduction of the fluid pressure in said pressure fluid conduit and consequent movement of said valve member into valve-closing position.

3. A combined valve and shut-off means therefor, comprising in combination, a valve casing having a fluid inlet and a fluid outlet and a valve seat therebetween; a valve member in said valve casing movable between valve-opening and valve-closing position; fluid pressure operable means for holding said valve member in valve-opening position, said valve member automatically returning into valve-closing position when exertion of fluid pressure on said fluid pressure operable means is terminated; auxiliary valve means operable for admitting fluid under pressure to said fluid pressure operable means for initially moving said valve member into valve-opening position; manually operable means for operating said auxiliary valve means; a pressure fluid conduit having an open end located in said fluid outlet facing the fluid passing through said fluid outlet and connected at its other end to said fluid pressure operable means; a nozzle member arranged in said fluid outlet between said valve seat and said open end of said pressure fluid conduit facing the same so as to be adapted to project a jet of fluid against said open end of said pressure fluid conduit when said valve member is in valve-opening position, thereby filling said pressure fluid conduit with fluid under pressure and operating said fluid pressure operable means, holding said valve member in valve-opening position; and conduit means terminating at one end in said fluid outlet between said nozzle member and said open end of said pressure fluid conduit for admitting gaseous medium sucked into said fluid outlet by the jet of fluid emitted by said nozzle member, so that termination of admittance of gaseous medium into said conduit means will automatically terminate formation of the jet of fluid, resulting in reduction of the fluid pressure in said pressure fluid conduit and consequent movement of said valve member into valve-closing position.

4. A combined valve and shut-off means therefor, comprising, in combination, a valve casing having a fluid inlet and a fluid outlet and a valve seat therebetween; a valve member in said valve casing movable between valve-opening and valve-closing positions; fluid pressure operable means for holding said valve member in valve-opening position, said valve member automatically returning into valve-closing position when exertion of fluid pressure on said fluid pressure operable means is terminated; a pressure fluid conduit having an open end and having its other end in communication with said fluid pressure operable means; a nozzle member in communication with said valve casing at a portion thereof intermediate said fluid inlet thereof and said valve seat thereof and facing said open end of said pressure fluid conduit so as to be adapted to project a jet of fluid against said open end of said pressure fluid conduit when fluid flows through said intermediate portion of said valve casing and consequently through said nozzle member, thereby filling said pressure fluid conduit with fluid under pressure and operating said fluid pressure operable means, holding said valve member in valve-opening position; and conduit means terminating at one end in the region intermediate said nozzle member and said open end of said pressure fluid conduit for admitting gaseous medium sucked into said region by the jet of fluid emitted by said nozzle member, so that termination of admittance of gaseous medium into said conduit means will automatically terminate formation of the jet of fluid, resulting in reduction of the fluid pressure in said pressure fluid conduit and consequent movement of said valve member to valve-closing position.

5. A combined valve and shut-off means therefor, comprising, in combination, a valve casing having a fluid inlet and a fluid outlet and a valve seat therebetween; a valve member in said valve casing movable between valve-opening and valve-closing positions; fluid pressure operable means for holding said valve member in valve-opening position, said valve member automatically returning into valve-closing position when exertion of fluid pressure on said fluid pressure operable means is terminated; enclosure means defining a projecting chamber; a pressure fluid conduit in said projecting chamber, said pressure fluid conduit having an open end and having its other end in communication with said fluid pressure operable means; a nozzle member also in said projecting chamber, said nozzle member being in communication with said valve casing at a portion thereof intermediate said fluid inlet thereof and said valve seat thereof and facing said open end of said pressure fluid conduit so as to be adapted to project a jet of fluid against said open end of said pressure fluid conduit when fluid flows through said intermediate portion of said valve casing and consequently through said nozzle member, thereby filling said pressure fluid conduit with fluid under pressure and operating said fluid pressure operable means, holding said valve member in valve-opening position; and conduit means terminating at one end in said projecting chamber in the region intermediate said nozzle member and said open end of said pressure fluid conduit for admitting gaseous medium sucked into said region by the jet of fluid emitted by said nozzle member, so that termination of admittance of gaseous medium into said conduit means will automatically terminate formation of the jet of fluid, resulting in reduction of the fluid pressure in said pressure fluid conduit and consequent movement of said valve member to valve-closing position.

6. A combined valve and shut-off means therefor as defined in claim 5 wherein the other end of said conduit means is adapted to be positioned at the desired liquid level in a receptacle to be filled so that when said liquid level is attained admittance of gaseous medium into said conduit means is terminated thereby automatically terminating formation of the jet of fluid, resulting in reduction of the fluid pressure in said pressure fluid conduit and consequent movement of said valve member to valve-closing position.

7. A combined valve and shut-off means therefor as defined in claim 5 wherein said projecting chamber is in communication with said fluid outlet of said valve casing so that fluid emanating from said nozzle member without being projected against said open end of said pressure fluid conduit may flow through said fluid outlet of said casing.

8. A combined valve and shut-off means therefor as defined in claim 5, and baffle means in said region for permitting the formation of the jet of fluid when gaseous medium is sucked into said region and for accelerating the termination of formation of the jet of fluid during the beginning of the termination of admittance of gaseous medium into said conduit means, resulting in acceleration of the reduction of the fluid pressure in said pressure fluid conduit and consequent acceleration of movement of said valve member to valve-closing position.

9. A combined valve and shut-off means therefor, comprising, in combination, a valve casing having a fluid inlet and a fluid outlet and a valve seat therebetween; a portion of said fluid outlet defining a projecting chamber; a valve member in said valve casing movable between valve-opening and valve-closing positions; fluid pressure operable means for holding said valve member in valve-opening position, said valve member automatically returning into valve-closing position when exertion of fluid pressure on said fluid pressure operable means is terminated; a pressure fluid conduit in said projecting chamber, said pressure fluid conduit having an open end and having its other end in communication with said fluid pressure operable means; a nozzle member also in said projecting chamber, said nozzle member being in communication with said valve casing at a portion thereof intermediate said fluid inlet thereof and said valve seat thereof and facing said open end of said pressure fluid conduit so as to be adapted to project a jet of fluid against said open end of said pressure fluid conduit when fluid flows through said intermediate portion of said valve casing and consequently through said nozzle member, thereby filling said pressure fluid conduit with fluid under pressure and operating said fluid pressure operable means, holding said valve member in valve-opening position; and conduit means terminating at one end in said projecting chamber in the region intermediate said nozzle member and said open end of said pressure fluid conduit for admitting gaseous medium sucked into said region by the jet of fluid emitted by said nozzle member, so that termination of admittance of gaseous medium into said conduit means will automatically terminate formation of the jet of fluid, resulting in reduction of the fluid pressure in said pressure fluid conduit and consequent movement of said valve member to valve-closing position.

10. A combined valve and shut-off means therefor, comprising, in combination, a valve casing having a fluid inlet and a fluid outlet and a valve seat therebetween; a valve member in said valve casing movable between valve-opening and valve-closing positions; fluid pressure operable means for holding said valve member in valve-opening position, said valve member automatically returning to valve-closing position when exertion of fluid pressure on said fluid pressure operable means is terminated; enclosure means defining a projecting chamber; a first pressure fluid conduit in said projecting chamber, said first pressure fluid conduit having an open end and having its other end in communication with said fluid pressure operable means; a nozzle member also in said projecting chamber and facing said open end of said first pressure fluid conduit; a second pressure fluid conduit for placing said nozzle member in communcation with said valve casing at a portion thereof intermediate said fluid inlet thereof and said valve seat thereof so that said nozzle member is adapted to project a jet of fluid against said open end of said first pressure fluid conduit when fluid flows through said intermediate portion of said valve casing and consequently through said second pressure fluid conduit and said nozzle member, thereby filling said first pressure fluid conduit with fluid under pressure and operating said fluid pressure operable means, holding said valve member in valve-opening position; and conduit means terminating at one end in said projecting chamber and in the region intermediate said nozzle member and said open end of said first pressure fluid conduit for admitting gaseous medium sucked into said region by the jet of fluid emitted by said nozzle member, so that termination of admittance of gaseous medium into said conduit means will automatically terminate formation of the jet of fluid, resulting in reduction of the fluid pressure in said first pressure fluid conduit and consequent movement of said valve member to valve-closing position.

11. A combined valve and shut-off means therefor, comprising, in combination, a valve casing having a fluid inlet and a fluid outlet and a valve seat therebetween; a valve member in said valve casing movable between valve-opening and valve-closing positions; fluid pressure operable means for holding said valve member in valve-opening position, said valve member automatically returning into valve-closing position when exertion of fluid pressure on said fluid pressure operable means is terminated; enclosure means defining a projecting chamber; a first pressure fluid conduit in said projecting chamber, said first pressure fluid conduit having an open end and having its other end in communication with said fluid pressure operable means; a nozzle member also in said projecting chamber and facing said open end of said first pressure fluid conduit; a second pressure fluid conduit for placing said nozzle member in communication with said valve casing at a portion thereof intermediate said fluid inlet thereof and said valve seat thereof; auxiliary valve means in said second pressure fluid conduit movable between valve-opening and valve-closing positions so that said nozzle member is adapted to project a jet of fluid against said open end of said first pressure fluid conduit when said auxiliary valve means is in valve-opening position and fluid flows through said intermediate portion of said valve casing and consequently through said second pressure fluid conduit and said nozzle member, thereby filling said first pressure fluid conduit with fluid under pressure and operating said fluid pressure operable means, holding said valve member in valve-opening position; and conduit means terminating at one end in said projecting chamber and in the region intermediate said nozzle member and said open end of said first pressure fluid conduit for admitting gaseous medium sucked into said region by the jet of fluid emitted by said nozzle member, so that termination of admittance of gaseous medium into said conduit means will automatically terminate formation of the jet of fluid, resulting in reduction of the fluid pressure in said first pressure fluid conduit and consequent movement of said valve member to valve-closing position.

12. A combined valve and shut-off means therefor as defined in claim 11, and biasing means for maintaining said auxiliary valve means in valve-closing position when the same is in said last-mentioned position thereof and for permitting said auxiliary valve means to remain in valve-opening position when the same has been moved into said last-mentioned position thereof against the bias of said biasing means.

13. A combined valve and shut-off means therefor, comprising, in combination, a valve casing having a fluid inlet and a fluid outlet and a valve seat therebetween; a non-return valve member in said valve casing movable between valve-opening and valve-closing positions; fluid pressure operable piston means for holding said valve member in valve-opening position, said fluid pressure operable piston means having opposite faces each having a greater effective area than said valve member, said valve member automatically returning into valve-closing position when exertion of fluid pressure on at least one face of said fluid pressure operable piston means is terminated; enclosure means defining a projecting chamber; a pressure fluid conduit in said projecting chamber, said pressure fluid conduit having an open end and having its other end in communication with one face of said fluid pressure operable piston means, the other face of said fluid pressure operable piston means being in communication with said valve casing at a first portion thereof intermediate said valve seat thereof and said fluid outlet thereof; a nozzle member also in said projecting chamber, said nozzle member being in communication with said valve casing at a second portion thereof intermediate said fluid inlet thereof and said valve seat thereof and facing said open end of said pressure fluid against said open end of said pressure fluid conduit when fluid flows through said intermediate portion of said valve casing and consequently through said nozzle member, thereby filling said pressure fluid conduit with fluid under pressure and exerting a force on said one face of said fluid pressure operable piston means, thereby holding said valve member in valve-opening position; and conduit means terminating at one end in said projecting chamber in the region intermediate said nozzle member and said open end of said pressure fluid conduit for admitting gaseous medium sucked into said region by the jet of fluid emitted by said nozzle member, so that termination of admittance of gaseous medium into said conduit means will automatically terminate formation of the jet of fluid, resulting in reduction of the fluid pressure in said pressure fluid conduit and of the force exerted on said one face of said fluid pressure operable piston means and consequent movement of said valve member to valve-closing position.

14. A combined valve and shut-off means therefor as defined in claim 13, and manually operable means for at least initially subjecting said one face of said fluid pressure operable piston means to a force whereby said valve member may initially be moved manually to valve-opening position.

15. A combined valve and shut-off means therefor as defined in claim 13, a second fluid conduit for placing said one face of said fluid pressure operable piston means in communication with said second portion of said valve casing; auxiliary valve means in said second fluid conduit movable between valve-opening and valve-closing positions; and manually operable means for moving said auxiliary valve means to valve-opening position so as to subject said one face of said fluid pressure operable means to the fluid pressure prevailing in said second portion of said valve casing thereby moving said valve member to valve-opening position.

16. A combined valve and shut-off means therefor, comprising, in combination, a valve casing having a fluid inlet and a fluid outlet and a valve seat therebetween; a non-return valve member in said valve casing movable between valve-opening and valve-closing positions; fluid pressure operable piston means for holding said valve member in valve-opening position, said fluid pressure operable piston means having opposite faces each having a greater effective area than said valve member, said valve member automatically returning into valve-closing position when exertion of fluid pressure on at least one face of said fluid pressure operable piston means is terminated; enclosure means defining a projecting chamber; a first pressure fluid conduit in said projecting chamber, said first pressure fluid conduit having an open end and having its other end in communication with one face of said fluid pressure operable piston means, the other face of said fluid pressure operable piston means being in communication with said valve casing at a first portion thereof intermediate said valve seat thereof and said fluid outlet thereof; a nozzle member also in said projecting chamber and facing said open end of said first pressure fluid conduit; a second pressure fluid conduit for placing said nozzle member in communication with said valve casing at a second portion thereof intermediate said fluid inlet thereof and said valve seat thereof; auxiliary valve means in said second pressure fluid conduit movable between valve-opening and valve-closing positions so that said nozzle member is adapted to project a jet of fluid against said open end of said first pressure fluid conduit when said auxiliary valve means is in valve-opening position and fluid flows through said second portion of said valve casing and consequently through said second pressure fluid conduit and said nozzle member, thereby filling said first pressure fluid conduit with fluid under pressure and exerting a force on said one face of said fluid pressure operable piston means, thereby holding said valve member in valve-opening position; and conduit means terminating at one end in said projecting chamber in the region intermediate said nozzle member and said open end of said first pressure fluid conduit for admitting gaseous medium sucked into said region by the jet of fluid emitted by said nozzle member, so that termination of admittance of gaseous medium into said conduit means will automatically terminate formation of the jet of fluid, resulting in reduction of the fluid pressure in said first pressure fluid conduit and of the force exerted on said one face of said fluid pressure operable piston means and consequent movement of said valve member to valve-closing position.

17. A combined valve and shut-off means therefor as defined in claim 16, and manually operable means for moving said auxiliary valve means to valve-opening position so that fluid under pressure located in said second portion of said valve casing may fill said first fluid conduit and consequently exert a force on said one face of said fluid pressure operable piston means so as to move said main valve member to valve-opening position.

18. A combined valve and shut-off means therefor as defined in claim 16, a third fluid conduit for placing said one face of said fluid pressure operable piston means in communication with said second portion of said valve casing; second auxiliary valve means in said third fluid conduit movable between valve-opening and valve-closing positions; and manually operable means for moving said second auxiliary valve means to valve-opening position so as to subject said one face of said fluid pressure operable means to the fluid pressure prevailing in said second portion of said valve casing thereby moving said valve member to valve-opening position.

19. A combined valve and shut-off means therefor as defined in claim 18, a third auxiliary valve means in said third fluid conduit intermediate said second auxiliary valve means and said second portion of said valve casing, said third auxiliary valve means being movable between valve-opening and valve-closing positions; and biasing means for maintaining said third auxiliary valve means in valve-closing position when the same is in said last-mentioned position thereof and for permitting said third auxiliary valve means to move to valve-opening position thereof only when the fluid pressure prevailing in said second portion of said valve casing is at least equal to a predetermined pressure.

20. A combined valve and shut-off means therefor, comprising, in combination, a valve casing having a fluid inlet and a fluid outlet and a valve seat therebetween; a valve member in said valve casing movable between valve-opening and valve-closing positions; fluid pressure operable means for holding said valve member in valve-opening position, said valve member automatically returning into valve-closing position when exertion of fluid pressure on said fluid pressure operable means is terminated; enclosure means defining a projecting chamber; a pressure fluid conduit in said projecting chamber, said pressure fluid conduit having an open end and having its other end in communication with said fluid pressure operable means; a nozzle member also in said projecting chamber, said nozzle member being in communication with said valve casing at a portion thereof intermediate said fluid inlet thereof and said valve seat thereof and facing said open end of said pressure fluid conduit so as to be adapted to project a jet of fluid against said open end of said pressure fluid conduit when fluid flows through said intermediate portion of said valve casing and consequently through said nozzle member, thereby filling said pressure fluid conduit with fluid under pressure and operating said fluid pressure operable means, holding said valve member in valve-opening position; conduit means terminating at one end in said projecting chamber in the region intermediate said nozzle member and said open end of said pressure fluid conduit for admitting gaseous medium sucked into said region by the jet of fluid emitted by said nozzle member, so that termination of admittance of gaseous medium into said conduit means will automatically terminate formation of the jet of fluid, resulting in reduction of the fluid pressure in said pressure fluid conduit and consequent movement of said valve member to valve-closing position; biasing means for biasing said valve member to valve-closing position; and releasable manually-operable connecting means connected to said biasing means and to said valve member and movable between an operated position wherein said biasing means is disconnected from said valve member and a released position wherein said biasing means is connected to said valve member and biases the same to valve-closing position whereby when said releasable manually-operable connecting means is released said biasing means biases said valve member to valve-closing position.

21. A combined valve and shut-off means therefor, comprising, in combination, a valve casing having a fluid inlet and a fluid outlet and a valve seat therebetween; a valve member in said valve casing movable between valve-opening, valve-intermediate and valve-closing positions; fluid pressure operable means for holding said valve member in valve-opening and valve-intermediate positions, first enclosure means defining a first projecting chamber; second enclosure means defining a second projecting chamber; a first pressure fluid conduit in said first projecting chamber, said first pressure fluid conduit having an open end and having its other end in communication with said fluid pressure operable means only when the same holds said valve member in valve-opening position; a second pressure fluid conduit in said second projecting chamber, said second pressure fluid conduit having an open end and having its other end in communication with said fluid pressure operable means at least when the same holds said valve member in valve-intermediate position; a first nozzle member also in said first projecting chamber, said first nozzle member being in communication with said valve casing at a portion thereof intermediate said fluid inlet thereof and said valve seat thereof and facing said open end of said first pressure fluid conduit; a second nozzle member also in said second projecting chamber, said second nozzle member also being in communication with said valve casing at a portion thereof intermediate said fluid inlet thereof and said valve seat thereof and facing said open end of said second pressure fluid conduit; first conduit means terminating at one in said first projecting chamber in the intermediate said first nozzle member and said open end of said first pressure fluid conduit for admitting gaseous medium sucked into said region by the jet of fluid emitted by said first nozzle member; and second conduit means terminating at one end in said second projecting chamber in the region intermediate said second nozzle member and said open end of said second pressure fluid conduit for admitting gaseous medium sucked into said last-mentioned region by the jet of fluid emitted by said second nozzle member.

22. A combined valve and shut-off means therefor as defined in claim 21 wherein said first and second conduit means comprise opening means extending through said first and second enclosure means, respectively.

23. A combined valve and shut-off means therefor as defined in claim 21, said fluid pressure operable means including a cylinder having an end wall and a piston having a piston face, said piston being slidably arranged in said cylinder so that said end wall and said piston face define an expansible and contractable pressure chamber therebetween, said piston being adapted to hold said valve member in valve-opening position when said piston face is spaced a first distance from said end wall and in valve-intermediate position when said piston face is spaced a second distance smaller than said first distance from said end wall, said first pressure fluid conduit being in communication with said pressure chamber at a first portion thereof and said second pressure fluid conduit being in communication with said pressure chamber at a second portion thereof axially spaced from said first portion thereof, said piston being adapted to cover said first portion when said piston face is spaced less than said first distance from said end wall and to uncover said second portion at least when said piston face is spaced approximately said second distance from said end wall.

24. A combined valve and shut-off means therefor as defined in claim 23 wherein said first portion of said pressure chamber is nearer to said end wall of said cylinder than said second portion of said pressure chamber; and passage means extending through said piston, opening at said piston face thereof and at a side wall portion thereof in alignment with said second portion of said pressure chamber for placing said second pressure fluid conduit in communication with said pressure chamber when said piston face of said piston is spaced approximately said second distance from said end wall of said cylinder.

25. A combined valve and shut-off means therefor, comprising, in combination, a valve casing having a fluid inlet and a fluid outlet and a valve seat therebetween; a valve member in said valve casing movable between valve-opening and valve-closing positions, said valve member being biased to valve-closing position; manually-operable means for moving said valve member against its bias to valve-opening position; fluid pressure operable retaining means for releasably retaining said manually-operable means when said manually-operable means has moved said valve member to valve-opening position, thereby retaining said valve member in valve-opening position, said fluid pressure operable retaining means permitting manually-operable means to permit said valve member to return into valve-closing position when exertion of fluid pressure on said fluid pressure operable retaining means is terminated; enclosure means defining a projecting chamber; a pressure fluid conduit in said projecting chamber, said pressure fluid conduit having an open end and having its other end in communication with said fluid pressure operable retaining means; a nozzle member also in said projecting chamber, said nozzle member being in communication with said valve casing at a portion thereof intermediate said fluid inlet thereof and said valve seat thereof and facing said open end of said pressure fluid conduit so as to be adapted to project a jet of fluid against said open end of said pressure fluid conduit when fluid flows through said intermediate portion of said valve casing and consequently through said nozzle member, thereby filling said pressure fluid conduit with fluid under pressure and operating said fluid pressure operable retaining means, holding said valve member in valve-opening position; and conduit means terminating at one end in said projecting chamber in the region intermediate said nozzle member and said open end of said pressure fluid conduit for admitting gaseous medium sucked into said region by the jet of fluid emitted by said nozzle member, so that termination of admittance of gaseous medium into said conduit means will automatically terminate formation of the jet of fluid, resulting in reduction of the fluid pressure in said pressure fluid conduit and consequent movement of said valve member to valve-closing position.

26. A combined valve and shut-off means therefor as defined in claim 25 wherein said fluid pressure operable retaining means includes a chamber having a deformable wall portion, an engaging member adapted to engage said manually-operable means for retaining the latter when the same has moved said valve member to valve-opening position, and a connecting member interconnecting said deformable wall portion of said chamber and said engaging member, said engaging member engaging said manually-operable means only when said nozzle member projects the jet of fluid against said open end of said pressure fluid conduit so as to fill said pressure fluid conduit and consequently said last-mentioned chamber with fluid under pressure.

27. A combined valve and shut-off means therefor as defined in claim 25 wherein said fluid pressure operable retaining means includes a chamber having a deformable wall portion and engaging means connected thereto and adapted to engage said manually-operable means for retaining the latter when the same has moved said valve member to valve-opening position, said engaging means engaging said manually-operable means only when said nozzle member projects the jet of fluid against said open end of said pressure fluid conduit so as to fill said pressure fluid conduit and consequently said last-mentioned chamber with fluid under pressure.

28. A combined valve and shut-off means therefor as defined in claim 27, and manually-actuatable means operatively associated with said fluid pressure operable retaining means for moving the same to a position wherein it releases said manually-operable means irrespective of the pressure prevailing within said last-mentioned chamber, whereby said valve member may be moved manually to valve-closing position irrespective of the existence of the jet of fluid.

29. A combined valve and shut-off means therefor, comprising, in combination, a valve casing having a fluid inlet and a fluid outlet and a valve seat therebetween; a valve member in said valve casing movable between valve-opening and valve-closing positions; fluid pressure operable means for holding said valve member in valve-opening position, said valve member automatically returning into valve-closing position when exertion of fluid pressure on said fluid pressure operable means is terminated; a pressure fluid conduit having an open end and having its other end in communication with said fluid pressure operable means; a nozzle member in communication with said valve casing and facing said open end of said pressure fluid conduit so as to be adapted to project a jet of fluid against said open end of said pressure fluid conduit when fluid flows through said valve casing and consequently through said nozzle member, thereby filling said pressure fluid conduit with fluid under pressure and operating said fluid pressure operable means, holding said valve member in valve-opening position; and conduit means terminating at one end in the region intermediate said nozzle member and said open end of said pressure fluid conduit for admitting gaseous medium sucked into said region by the jet of fluid emitted by said nozzle member, so that termination of admittance of gaseous medium into said conduit means will automatically terminate formation of the jet of fluid, resulting in reduction of the fluid pressure in said pressure fluid conduit and consequent movement of said valve member to valve-closing position.

30. A combined valve and shut-off means therefor, comprising, in combination, a valve casing having a fluid inlet and a fluid outlet and a valve seat therebetween; a valve member in said valve casing movable between valve-opening and valve-closing positions; fluid pressure operable means for holding said valve member in valve opening position, said valve member automatically returning into valve-closing position when exertion of fluid pressure on said fluid pressure operable means is terminated; a pressure fluid conduit having an open end and having its other end in communication with said fluid pressure operable means; a nozzle member in communication with said valve casing at a portion thereof intermediate said fluid outlet thereof and said valve seat thereof and facing said open end of said pressure fluid conduit so as to be adapted to project a jet of fluid against said open end of said pressure fluid conduit when fluid flows through said intermediate portion of said valve casing and consequently through said nozzle member, thereby filling said pressure fluid conduit with fluid under pressure and operating said fluid pressure operable means, holding said valve member in valve-opening position; and conduit means terminating at one end in the region intermediate said nozzle member and said open end of said pressure fluid conduit for admitting gaseous medium sucked into said region by the jet of fluid emitted by said nozzle member, so that termination of admittance of gaseous medium into said conduit means will automatically terminate formation of the jet of fluid, resulting in reduction of the fluid pressure in said pressure fluid conduit and consequent movement of said valve member to valve-closing position.

References Cited in the file of this patent

UNITED STATES PATENTS

| | | |
|---|---|---|
| 2,138,380 | Killman | Nov. 29, 1938 |
| 2,222,923 | Warrick | Nov. 26, 1940 |
| 2,527,760 | Piquerez | Oct. 31, 1950 |
| 2,587,839 | Grise | Mar. 4, 1952 |

FOREIGN PATENTS

| | | |
|---|---|---|
| 55,183 | Netherlands | of 1943 |